US012789377B2

(12) United States Patent
Ni et al.

(10) Patent No.: US 12,789,377 B2
(45) Date of Patent: Nov. 10, 2026

(54) METHOD FOR CONTROLLING INDUSTRIAL ROBOT AND INDUSTRIAL ROBOT

(71) Applicant: ABB SCHWEIZ AG, Baden (CH)

(72) Inventors: Xiaoyun Ni, Shanghai (CN); Yin Tian, Shanghai (CN)

(73) Assignee: ABB Schweiz AG, Baden (CH)

( * ) Notice: Subject to any disclaimer, the term of this patent is extended or adjusted under 35 U.S.C. 154(b) by 15 days.

(21) Appl. No.: 18/985,985

(22) Filed: Dec. 18, 2024

(65) Prior Publication Data

US 2025/0249584 A1 Aug. 7, 2025

Related U.S. Application Data

(63) Continuation of application No. PCT/CN2022/105771, filed on Jul. 14, 2022.

(51) Int. Cl.

| | |
|---|---|
| ***B25J 9/16*** | (2006.01) |
| ***B25J 9/02*** | (2006.01) |
| ***B25J 11/00*** | (2006.01) |
| ***B25J 13/00*** | (2006.01) |
| ***G06F 3/16*** | (2006.01) |

(Continued)

(52) U.S. Cl.
CPC ............. *B25J 9/1664* (2013.01); *B25J 9/023* (2013.01); *B25J 9/161* (2013.01); *B25J 11/0005* (2013.01); *B25J 13/003* (2013.01); *G06F 3/167* (2013.01); *G10L 15/22* (2013.01); *B25J 9/1656* (2013.01); *B25J 9/1694* (2013.01); *G05B 2219/35453* (2013.01); *G05B 2219/37337* (2013.01);

(Continued)

(58) Field of Classification Search
CPC . B25J 9/1664; B25J 9/023; B25J 9/161; B25J 11/0005; B25J 13/003; B25J 9/1656; B25J 9/1694; G06F 3/167; G10L 15/22; G10L 21/02; G10L 2015/223; G05B 2219/35453; G05B 2219/37337; G05B 2219/39441
See application file for complete search history.

(56) References Cited

U.S. PATENT DOCUMENTS 10,019,566 B1 * 7/2018 Gallagher .............. B25J 9/1666
10,783,931 B1 * 9/2020 Mercer-Taylor ....... B25J 9/1666
(Continued)

FOREIGN PATENT DOCUMENTS

CN 101286058 A 10/2008
CN 102323822 A 1/2012
(Continued)

*Primary Examiner* — Sohana Tanju Khayer
(74) *Attorney, Agent, or Firm* — Whitmyer IP Group LLC

(57) ABSTRACT

Embodiments of the present disclosure provide a method for controlling an industrial robot, an industrial robot, and a computer readable media. In the method, a motion mode for the industrial robot is determined based on a first voice input. One or more motion parameters in the determined motion mode are determined based on a second voice input. The industrial robot is controlled to move in the determined motion mode according to the one or more motion parameters. According to embodiments of the present disclosure, by determining a motion mode first and then determining motion parameters in the motion mode, a more accurate movement of an industrial robot can be realized through voice control, thus improving user experience of robot control.

11 Claims, 10 Drawing Sheets

(51) Int. Cl.
*G10L 15/22* (2006.01)
*G10L 21/02* (2013.01)

(52) U.S. Cl.
CPC ............... *G05B 2219/39441* (2013.01); *G10L 2015/223* (2013.01); *G10L 21/02* (2013.01)

(56) References Cited

U.S. PATENT DOCUMENTS

| | | | | |
|---|---|---|---|---|
| 11,351,680 | B1 * | 6/2022 | Rosenberg | B25J 19/0095 |
| 12,561,659 | B2 * | 2/2026 | Cella | G06Q 10/0633 |
| 2015/0343641 | A1 * | 12/2015 | Maruyama | B25J 19/023 901/1 |
| 2018/0101166 | A1 * | 4/2018 | Aldridge | B25J 9/1671 |
| 2018/0250829 | A1 * | 9/2018 | Hashimoto | A61B 34/37 |
| 2019/0365488 | A1 * | 12/2019 | Geiger | B25J 13/003 |
| 2020/0246977 | A1 * | 8/2020 | Swietojanski | G06F 3/167 |
| 2022/0161427 | A1 * | 5/2022 | Yerazunis | B25J 9/1674 |
| 2022/0410368 | A1 * | 12/2022 | Nam | B25J 9/0003 |
| 2023/0372011 | A1 * | 11/2023 | Herzog | A61B 18/203 |
| 2023/0372037 | A1 * | 11/2023 | Herzog | A61B 34/32 |
| 2023/0400446 | A1 * | 12/2023 | Karydis | G05D 1/248 |
| 2024/0383144 | A1 * | 11/2024 | Kamedula | B25J 9/1689 |
| 2025/0127362 | A1 * | 4/2025 | Ding | G05D 1/65 |
| 2025/0249574 | A1 * | 8/2025 | Wang | B25J 9/0081 |

FOREIGN PATENT DOCUMENTS

| | | | |
|---|---|---|---|
| CN | 108453742 | A | 8/2018 |
| CN | 112621715 | A | 4/2021 |
| CN | 114536323 | A | 5/2022 |
| EP | 0145683 | A1 | 6/1985 |

* cited by examiner

METHOD FOR CONTROLLING INDUSTRIAL ROBOT AND INDUSTRIAL ROBOT

CROSS-REFERENCE TO RELATED APPLICATIONS

This application claims priority to and is a continuation application of international patent application number PCT/CN2022/105771, filed on Jul. 14, 2022, which is herein incorporated by reference in its entirety.

FIELD

Example embodiments of the present disclosure generally relate to a field of voice control, and more specifically, to a method for controlling an industrial robot, an industrial robot, and a computer readable media.

BACKGROUND

Voice recognition technology is widely used in industry, home appliances, communications, automotive electronics, medical treatment, home services, consumer electronics and other fields. The combination of voice recognition technology and robot control technology reflects the automation and intelligence of technology, changes the traditional production mode, reduces the labor intensity of workers, improves labor productivity, and promotes the development of traditional technology in the direction of intelligence. However, conventional voice control of industrial robots is not accurate for controlling precise movements and has a bad user experience. Therefore, it is desired to propose a solution for controlling precise movements of industrial robots based on a voice input.

SUMMARY

Example embodiments of the present disclosure provide a solution for robot control based on voice input.

In a first aspect, example embodiments of the present disclosure provide a method for controlling an industrial robot. The method comprises determining a motion mode for the industrial robot based on a first voice input, and determining one or more motion parameters in the determined motion mode based on a second voice input. The method further comprises controlling the industrial robot to move in the determined motion mode according to the one or more motion parameters. In this way, by means of determining a motion mode first and then determining motion parameters, a more accurate movement of an industrial robot can be realized through voice control, thus improving user experience of robot control.

In some embodiments, the step of determining the motion mode may comprise determining a mode identifier based on voice recognition to the first voice input, and determining the motion mode based on the mode identifier and a Dynamic Link Library (DLL) encapsulated in the industrial robot. Wherein the DLL stores a plurality of predetermined modes and a plurality of predetermined parameter ranges for controlling a movement of the industrial robot. In this way, the motion mode is determined using a self-encapsulated library, rather than calling a library from a third party. Therefore, the user experience of robot control is further improved by means of a self-encapsulated and customized library.

In some embodiments, the step of controlling the industrial robot may comprise obtaining a predetermined parameter range corresponding to the determined motion mode from the DLL, determining a validity of the one or more motion parameters based on the predetermined parameter range, and in response to determining that the one or more motion parameters are valid, controlling the industrial robot to move according to the one or more motion parameters. In this way, an error during movement can be prevented, thus enabling efficient control of the industrial robot.

In some embodiments, the step of determining the validity of the one or more motion parameters may comprise determining whether each of the one or more motion parameters is within the predetermined parameter range, and in response to determining that each of the one or more motion parameters is within the predetermined parameter range, determining that the one or more motion parameters are valid. In this way, by means of determining each motion parameter with a corresponding predetermined parameter range, errors can be avoid, thereby improving the efficiency of robot control.

In some embodiments, the plurality of predetermined modes include at least a joint angle mode and a Cartesian spatial pose mode, the joint angle mode indicates that a movement of the industrial robot is represented by an angle of a joint, and the Cartesian spatial pose mode indicates that a movement of the industrial robot is represented by a Cartesian Coordinate System. In this way, a movement including single axis motions and Cartesian spatial linear motions can be voice controlled. Therefore, voice control of most industrial robots on the market can be supported.

In some embodiments, the step of determining the validity of the one or more motion parameters may comprises in response to determining that the determined motion mode is the joint angle mode, comparing a number of joints indicated in the one or more motion parameters to a number of joints of the industrial robot; and in response to determining that the number of joints indicated in the one or more motion parameters exceeds the number of joints of the industrial robot, determining that the one or more motion parameters are invalid. In this way, it is ensured that a number of parameters corresponding to a real number of joints of the industrial robot can be provided.

In some embodiments, the step of determining the validity of the one or more motion parameters may comprise in response to determining that the determined motion mode is the Cartesian spatial pose mode, determining a sum of squares of quaternion values included in the one or more motion parameters; and in response to determining that the sum of squares does not equal to 1, determining that the one or more motion parameters are invalid. In this way, it is ensured that motion parameters for the Cartesian spatial pose mode can be correctly provided.

In some embodiments, the step of controlling the industrial robot may comprise receiving a real-time position from a sensor of the industrial robot, and controlling the industrial robot to move according to the real-time position data. In this way, a movement of the industrial robot can be adjusted in real-time, and thus enabling a high accuracy of control.

In some embodiments, the motion mode and the one or more motion parameters are represented in a text format. In this way, the motion mode and one or more motion parameters can be converted into a control signal via a User Datagram Protocol (UDP).

In some embodiments, the method may further comprise receiving a first recognized result of the first voice input and a second recognized result of the second voice input from an Industrial Personal Computer. Wherein the step of determining the motion mode comprises determining the motion mode based on the first recognized result, and the step of determining the one or more motion parameters comprises determining the one or more motion parameters based on the second recognized result. In this way, the voice recognition becomes more accurate and has stronger anti-interference ability in the noisy industrial environment.

In some embodiments, the first recognized result and the second recognized result are obtained through noise reduction. In this way, voice control of an industrial robot can be more accurate even in a noisy industrial environment.

In some embodiments, the step of controlling the industrial robot to move in the determined motion mode according to the one or more motion parameters may comprise converting the one or more motion parameters into a control signal, and controlling the industrial robot to move according to the control signal. In this way, motion parameters can be converted into a signal used to control the movement of the robot.

In a second aspect, example embodiments of the present disclosure provide an industrial robot in accordance with embodiments of the present disclosure. The industrial robot comprises a processor and a memory coupled to the processor comprising instructions. The instructions, when executed by the processor, enable the processor to perform the method for controlling an industrial robot according to embodiments of the present disclosure.

In a third aspect, example embodiments of the present disclosure provide a computer readable medium having instructions stored thereon. The instructions, when executed on at least one processor, cause the at least one processor to perform the method for controlling an industrial robot according to embodiments of the present disclosure.

In a fourth aspect, example embodiments of the present disclosure provide a computer program product embodied on a non-transitory computer readable medium. The non-transitory computer readable medium has instructions stored thereon, and the instructions, when executed by a processor, cause the processor to perform the method for controlling an industrial robot according to embodiments of the present disclosure.

DESCRIPTION OF DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

Throughout the drawings, the same or similar reference symbols are used to indicate the same or similar elements.

DETAILED DESCRIPTION OF EMBODIMENTS

Figure 1:
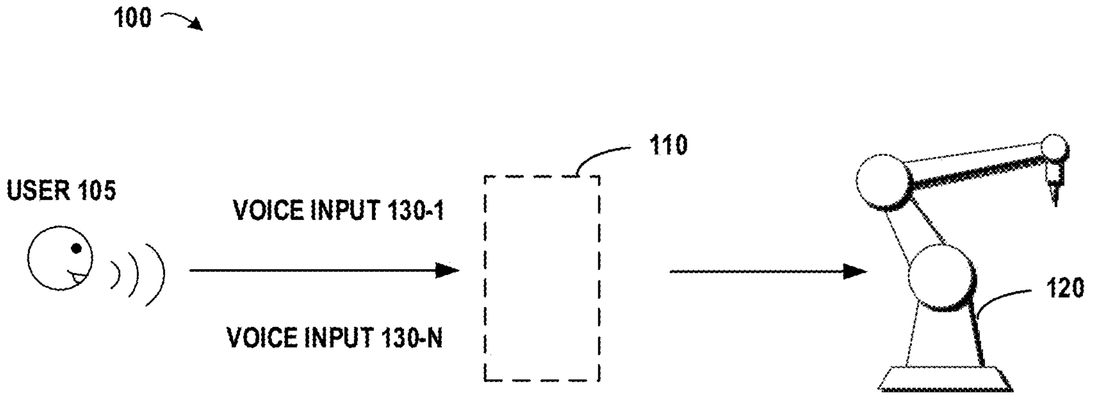
FIG. 1 illustrates an example environment in which embodiments of the present disclosure can be implemented.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

Generally, voice control is rarely used in industrial robots. There are some researches on controlling an industrial robot through voice control. In such researches, the robot is controlled based on a simple voice input (e.g. "stop"). However, there is no research on controlling precise and customized movements of an industrial robot based on a voice input.

In order to at least partially solve the above and other potential problems, a new method is provided for controlling an industrial robot according to embodiments of the present disclosure. In general, a motion mode for the industrial robot is determined based on a first voice input. One or more motion parameters in the determined motion mode are determined based on a second voice input. The industrial robot is controlled to move in the determined motion mode according to one or more motion parameters. Therefore, by means of determining a motion mode first and then determining motion parameters, a more accurate movement of an industrial robot can be realized through voice control, thus improving user experience of robot control.

FIG. 1 illustrates an example environment 100 in which embodiments of the present disclosure can be implemented. The example environment 100 includes a computing device 110 and an industrial robot 120 (hereinafter referred to as "robot"). A user 105 may control industrial robot 120 with a voice input, such as voice input 130-1 and voice input 130-N, via an audio input device (e.g. a microphone, a speaker that can receive voice signals, etc.). Voice input 130-1 and voice input 130-N may be collectively referred to as "voice input 130" or individually referred to as a "voice input 130", where N is an integer larger than one. The voice input 130-1 and 130-N may be entered at the same time, or at separated time.

The industrial robot 120 may be a single-axis robot or a multi-axis robot. For example, there are two to seven articulated joints in a multi-axis robot. Each joint may move within a predetermined range. The computing device 110 may be a personal computer, a laptop, a desktop, or a smartphone. In an embodiment of the present disclosure, the computing device 110 may be an Industrial Personal Computer (IPC) physically near the industrial robot 120. An IPC is a professional computer designed for industrial production control, which is used to monitor and control the machinery and equipment, production process, data parameters and so on in the industrial production process. In some embodiments, the computing device 110 may be omitted, and the voice input form the user 105 may be input to the industrial robot 120 directly.

In some embodiments, the industrial robot 120 may receive a voice input 130 directly (not shown) from a user 105. In such cases, the audio input device is configured in the industrial robot 120. In some embodiments, the audio input device is physically separated from both the computing device 110 and the industrial robot 120, and communicatively connected with the computing device 110 or the industrial robot 120.

Figure 2:
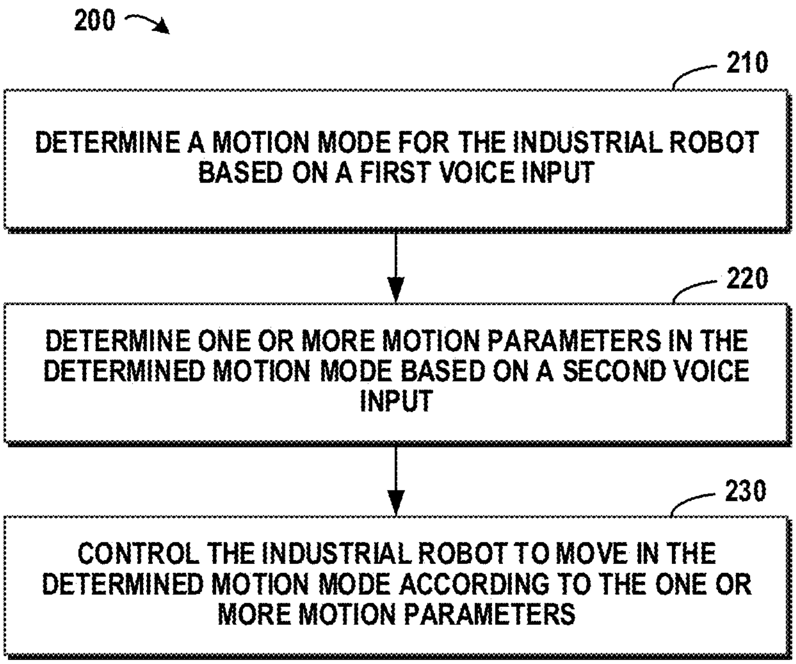
FIG. 2 illustrates a schematic flowchart of a method for controlling the industrial robot in accordance with embodiments of the present disclosure.

Reference will be made to FIG. 2 for a brief description of the present disclosure. FIG. 2 illustrates a schematic flowchart of a method 200 for controlling the industrial robot 120 in accordance with embodiments of the present disclosure. At 210, a motion mode for the industrial robot 120 is determined based on a first voice input (e.g. 130-1). At 220, one or more motion parameters in the determined motion mode are determined based on a second voice input (e.g. 130-N). At 230, the industrial robot 120 is controlled to move in the motion mode determined at 210 according to one or more motion parameters determined at 220. In this way, by means of determining a motion mode first and then determining motion parameters, a more accurate movement of an industrial robot can be realized through voice control, thus improving user experience of robot control.

A movement of the industrial robot 120 is controlled in a motion mode, such as a joint angle mode and a Cartesian spatial pose mode. The joint angle mode indicates that the movement of the industrial robot is represented by an angle of a joint. For example, for a 3-axis robot, a movement in the joint angle mode may be represented as the following: first joint: stay, second joint: 35°, third joint: 90°.

The Cartesian spatial pose mode indicates that a movement of the industrial robot is represented by a Cartesian coordinate system. For example, a movement in the Cartesian spatial pose mode may be represented as the following: X=0 mm, Y=6 mm, Z=2 mm, Q1=0.653, Q2=−0.271, Q3=0.653, Q4=−0.271. X, Y and Z represent translations in three directions in the Cartesian Coordinate System. Q1~Q4 are four quaternions together representing a rotation of the robot in the Cartesian coordinate system. A sum of squares of four quaternion values should be equal to 1. It should be noted that the above values are exemplary, and are not intended to limit the scope of the present disclosure.

Figure 3:
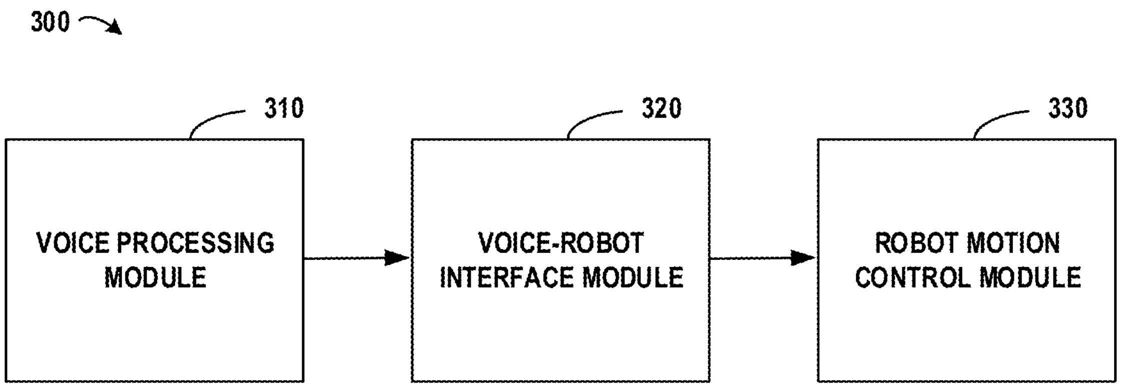
FIG. 3 illustrates a schematic diagram of architecture of a system for controlling the industrial robot in accordance with embodiments of the present disclosure.

FIG. 3 illustrates a schematic diagram of architecture of the system 300 for controlling the industrial robot 120 in accordance with embodiments of the present disclosure. The system 300 may include a voice processing module 310, a voice-robot interface module 320 and a robot motion control module 330. The voice input 130 may be processed by the voice processing module 310. This will be discussed below with reference to FIG. 4.

In some embodiments, the audio input device and the voice processing module 310 may be configured in the computing device 110. The voice-robot interface module 320 and the robot motion control module 330 may be configured in the industrial robot 120.

Alternatively, the voice processing module 310 also may be configured in the industrial robot 120. In some embodiments, the voice processing module 310 is configured in a cloud computing device (not shown). In some embodiments, the voice processing module 310, the voice-robot interface module 320 and the robot motion control module 330 are all configured in the computing device 110.

Figure 4:
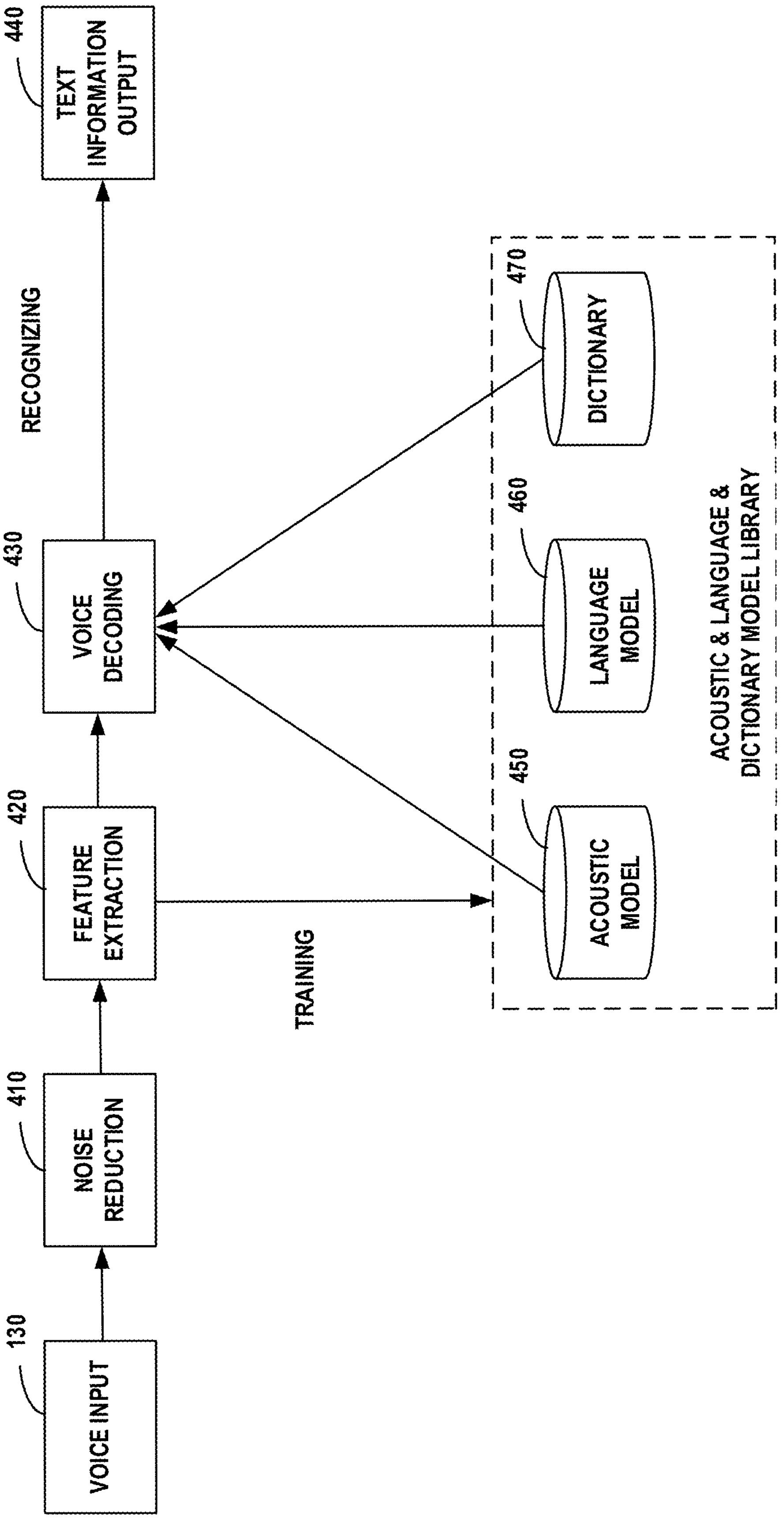
FIG. 4 illustrates a schematic diagram of a procedure for processing a voice input in accordance with embodiments of the present disclosure.

FIG. 4 illustrates a schematic diagram of a procedure for processing a voice input 130 by the voice processing module 310 in accordance with embodiments of the present disclosure. As shown in FIG. 4, an acoustic conversion and a noise reduction 410 are performed on a voice input 130 (e.g. 130-1 and 130-N) by the voice processing module 310. Then, a natural language processing, a feature extraction 420 and a voice decoding 430 are performed on the voice input 130 using an acoustic model 450, a language model 460 and a dictionary 470. The successfully recognized voice input is then converted into information in a text format and output at 440. A number of voice inputs 130 may be trained and self-learning, and then stored in an acoustic, language and dictionary model library (ALDML). The ALDML includes the acoustic model 450, the language model 460 and the dictionary 470. In this way, a voice input can be processed into a recognized result in text information.

Now return to FIG. 3. A voice-robot interface module 320 may determine a motion mode and one or more motion parameters for a movement of the industrial robot 120, based on the processed voice input 130. This will be discussed in detail below with reference to FIG. 2.

In some embodiments, the user 105 may be required to enter a voice input 130-1, to instruct a motion mode in which the industrial robot 120 operates. For example, the user 105 may be prompted with a first message via a display or a speaker. The first message may be a sentence, such as "Please select a motion mode" or "Please provide a motion code", etc. As a response, the user 105 may answer, e.g. "joint angle mode", "Cartesian spatial pose mode", "mode 1", "mode 2", "a first mode", or "a second mode" and so on as the voice input 130-1.

Once a motion mode is determined, the user 105 is required to enter a further voice input 130-N, to provide one or more motion parameters in the determined motion mode. For example, the user 105 may be prompted with a second message via the display or the speaker. The second message may be a sentence, such as "Please give parameters" or "Please provide parameters", etc. As a response, the user 105 may answer, e.g. "first joint: stay, second joint: 35°, third joint: 90° ", "first joint: 80°, second joint: 45°, third joint: 10°, fourth joint: 25°, fifth joint: stay, sixth joint: 75° ", or "X=0 mm, Y=6 mm, Z=0 mm, Q1=1, Q2=0, Q3=0, Q4=0"etc., as the voice input 130-N. It should be noted that the above described exemplary voice input 130-1 and voice input 130-N are only for the purpose of illustration, and are not intended to limit the scope of the present disclosure. In this way, the voice input 130 can be entered to the industrial robot 120 according to one or more messages, such that the computing resources of the industrial robot 120 can be balanced, avoiding entering too many voice inputs in a busy state.

In some embodiments, after determining the motion mode, a mode identifier (e.g. "mode 1" or "mode 2", etc.) may be determined by the voice-robot interface module 320 based on voice recognition to the voice input 130-1. The motion mode is determined by the voice-robot interface module 320 based on the mode identifier and a Dynamic Link Library (DLL) encapsulated in the industrial robot 120. The DLL stores a plurality of predetermined modes and a plurality of predetermined parameter ranges for controlling the movement of the industrial robot 120. The predetermined modes include at least a joint angle mode and a Cartesian spatial pose mode. In some embodiments, the motion mode may be determined by matching the mode identifier to one of the plurality of predetermined modes. The voice recognition may be performed by the voice processing module 310 as discussed with reference to FIG. 4. In this way, a motion mode is enter into the industrial robot 120 through a natural voice input, thus the form of man-machine information exchange becomes more convenient and natural.

In some embodiments, the voice processing module 310 is configured in the IPC near the industrial robot 120, thus the voice-robot interface module 320 may receive a first recognized result of the first voice input 130-1 and a second recognized result of the second voice input 130-N from the IPC. In such cases, the motion mode may be determined based on the first recognized result and one or more motion parameters may be determined based on the second recognized result. In this way, the voice recognition becomes more accurate and has stronger anti-interference ability in the noisy industrial environment.

In some embodiments, a validity of one or more motion parameters needs to be determined. In such cases, a predetermined parameter range corresponding to the determined motion mode may be obtained from the DLL. The validity of one or more motion parameters may be determined based on the obtained predetermined parameter range. If one or more motion parameters are valid, the industrial robot can be controlled to move according to one or more motion parameters. Otherwise, the determined one or more motion parameters need to be discarded, and the user may be requested to enter a new voice input for motion parameters. In this way, an error during movement can be prevented, thus enabling a more efficiency control of the industrial robot.

In some embodiments, the validity of one or more motion parameters may be determined by determining whether each of one or more motion parameters is within the predetermined parameter range. If so, one or more motion parameters are valid. The predetermined parameter range may be a position limit range, which defines a possible position that the industrial robot can move to. For example, in the case that the industrial robot 120 is controlled in the joint angle mode, and a largest angle that a first joint of the industrial robot 120 can move is 150°. If a motion parameter for the first joint is 160°, this motion parameter is invalid. Accordingly, a determination of one or more motion parameters being valid can be made. In this way, damages to the industrial robot caused by an accident can be reduced.

Figure 5:
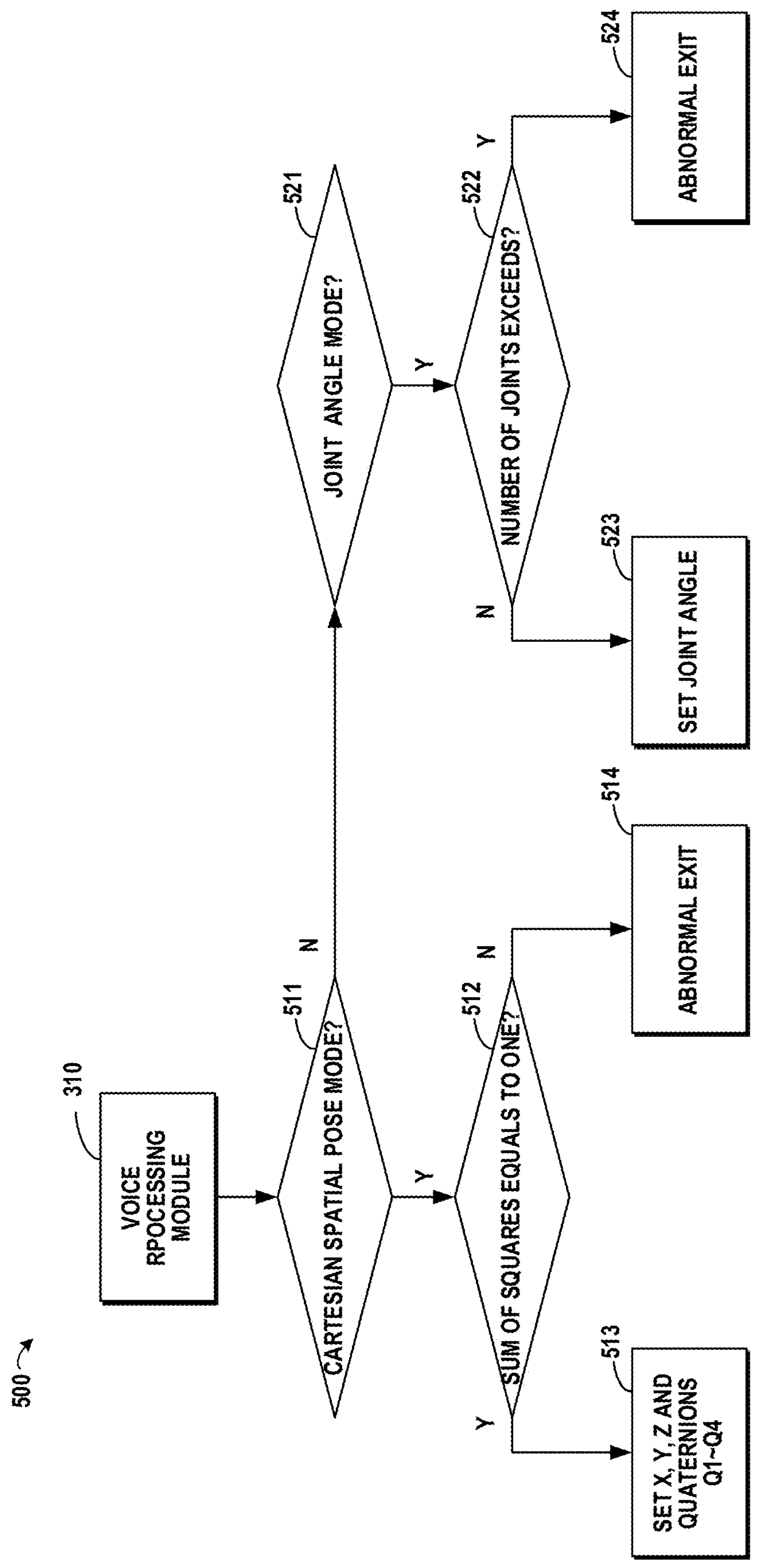
FIG. 5 illustrates a schematic diagram of a procedure for determining a validity of one or more motion parameters in accordance with some embodiments of the present disclosure.
Figure 9A:
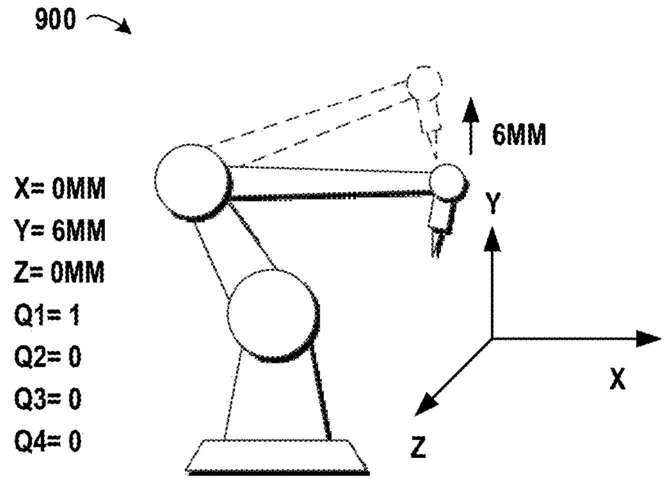
FIG. 9A illustrates an example of a movement for the industrial robot in the Cartesian spatial pose mode in accordance with embodiments of the present disclosure.

In some embodiments, a validity of one or more motion parameters further may be determined according to the determined motion mode. FIG. 5 illustrates a schematic diagram of a procedure 500 for determining a validity of one or more motion parameters in accordance with some embodiments of the present disclosure. FIG. 9A illustrates an example of a movement for the industrial robot in Cartesian spatial pose mode in accordance with embodiments of the present disclosure.

Now refer to FIG. 5, a determination of whether the determined motion mode is the Cartesian spatial pose mode may be made first at 511. If the determined motion mode is the Cartesian spatial pose mode, the validity of one or more motion parameters may further determined by determining whether a sum of squares of quaternion values included in the one or more motion parameters equals to 1 at 512. If the sum of squares is not equal to 1, a determination of one or more motion parameters being invalid is made. Then the procedure 500 exits abnormally at 514. Otherwise, the procedure 500 proceeds to a block 513 to set X, Y, Z and four quaternions Q1~Q4. In this way, it is ensured that motion parameters for the Cartesian spatial pose mode can be correctly provided.

If a determination that the determined motion mode is not the Cartesian spatial pose mode is made at 511, the procedure 500 proceeds to a block 521. A determination of whether the determined motion mode is the joint angle mode is made at 521. If the determined motion mode is the joint angle mode, the validity of one or more motion parameters may further determined by determining whether a number of joints indicated in one or more motion parameters exceeds a number of joints of the industrial robot 120 at 522. If the number of joints indicated in one or more motion parameters exceeds the number of joints of the industrial robot, a determination of one or more motion parameters being invalid is made. Then the procedure 500 exits abnormally at 524. Otherwise, the procedure 500 proceeds to a block 523 to set a joint angle. In this way, it is ensured that a number of parameters corresponding to a real number of joints can be provided.

Figure 6:
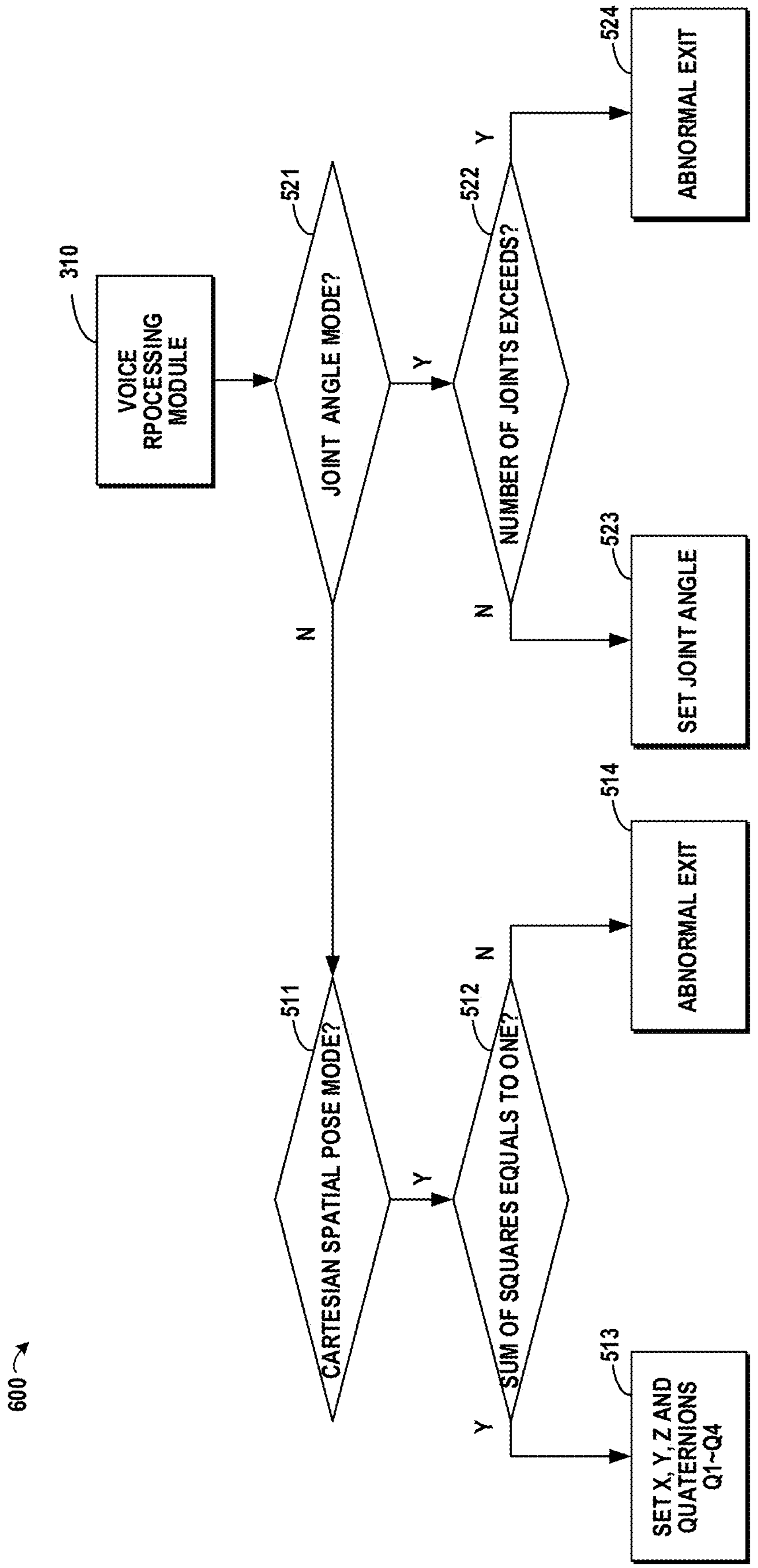
FIG. 6 illustrates a schematic diagram of a procedure for determining a validity of one or more motion parameters in accordance with some embodiments of the present disclosure.

Alternatively, a determination of whether the determined motion mode is the joint angle mode may be made first at 521. FIG. 6 illustrates a schematic diagram of a procedure 600 for determining a validity of one or more motion parameters in accordance with some embodiments of the present disclosure. If the determined motion mode is the joint angle mode, the validity of one or more motion parameters may further determined by determining whether a number of joints indicated in one or more motion parameters exceeds a number of joints of the industrial robot 120 at 522. If the number of joints indicated in one or more motion parameters exceeds the number of joints of the industrial robot, a determination of one or more motion parameters being invalid is made. Then the procedure 600 exits abnormally at 524. Otherwise, the procedure 600 proceeds to a block 523 to set a joint angle.

If a determination that the determined motion mode is not the joint angle mode is made at 521, the procedure 600 proceeds to a block 511. A determination of whether the determined motion mode is the Cartesian spatial pose mode is made at 511. If the determined motion mode is the Cartesian spatial pose mode, the validity of one or more motion parameters may further determined by determining whether a sum of squares of quaternion values included in the one or more motion parameters equals to 1 at 512. If the sum of squares is not equal to 1, a determination of one or more motion parameters being invalid is made. Then the procedure 600 exits abnormally at 514. Otherwise, the procedure 600 proceeds to a block 513 to set X, Y, Z and four quaternions Q1~Q4. The value of four quaternions is only exemplary, and is not intended to limit the scope of the present disclosure.

Figure 7:
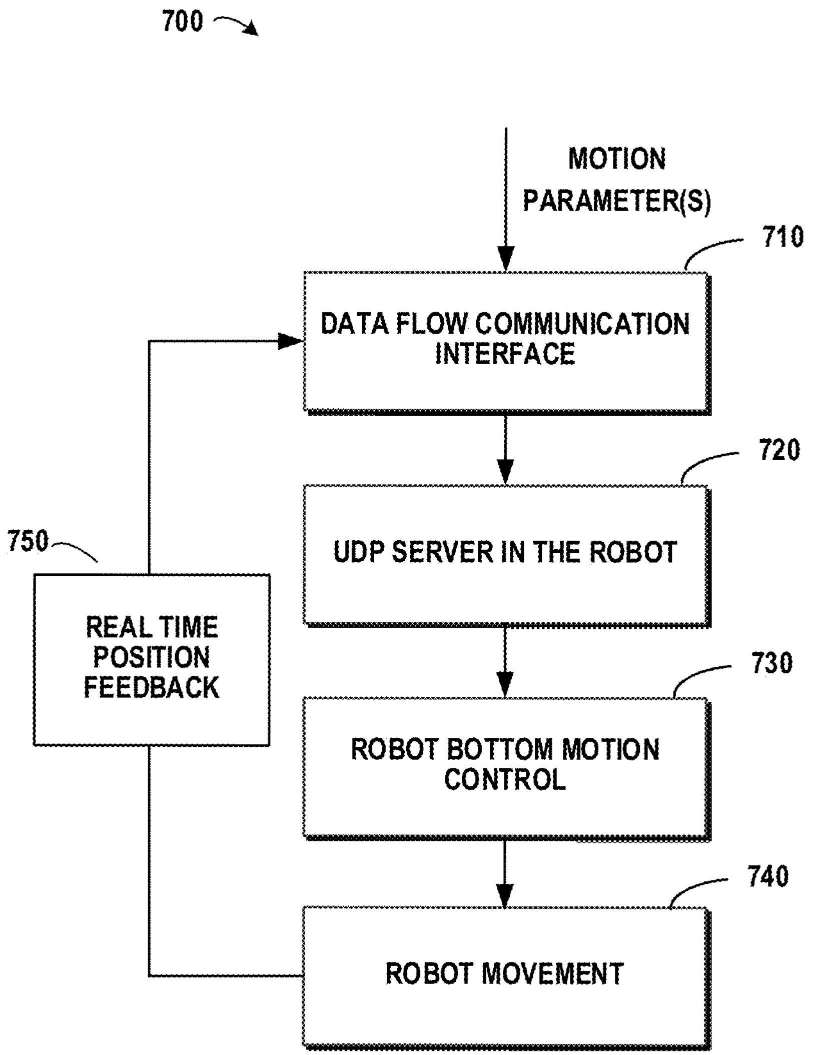
FIG. 7 illustrates a schematic diagram of a procedure for controlling the movement based on one or more motion parameters in accordance with embodiments of the present disclosure.
Figure 8:
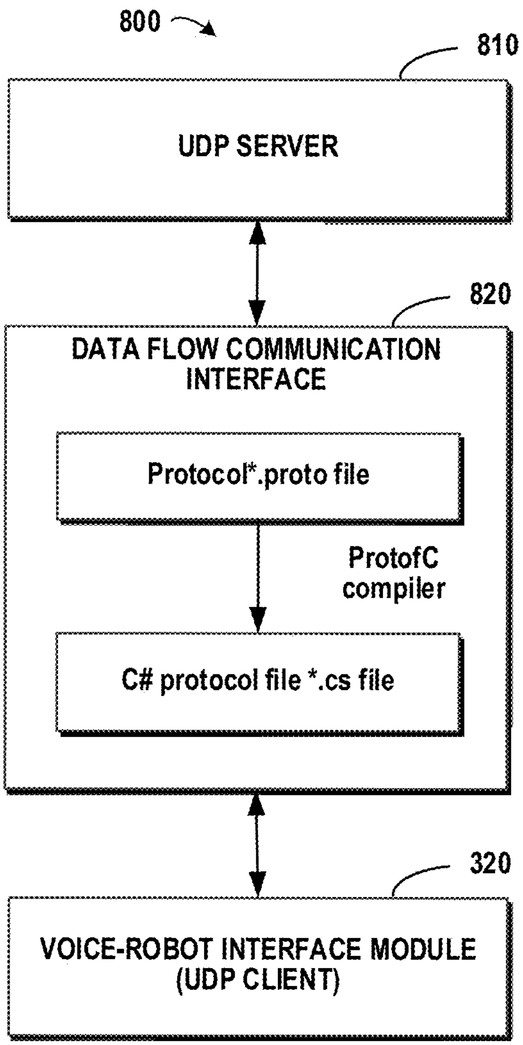
FIG. 8 illustrates a schematic diagram of architecture for communicating between a UDP server and the voice-robot interface module via a data flow communication interface in accordance with embodiments of the present disclosure.

Now return to FIG. 3, the robot motion control module 330 may control the industrial robot 120 to move in the determined motion mode according to one or more motion parameters. This will be discussed in detail with reference to FIG. 7 and FIG. 8. FIG. 7 illustrates a schematic diagram of a procedure 700 for controlling the movement by a robot motion control module 330 based on one or more motion parameters in accordance with embodiments of the present disclosure. As shown in FIG. 7, one or more valid motion parameters from the voice-robot interface module 320 are transmitted to an external position guidance engine (not shown) to drive the industrial robot 120. A real-time position from a sensor of the industrial robot is received and feedback to the external position guidance engine. The industrial robot is controlled to move according to the real-time position data. At 710, one or more valid motion parameters are entered into a data flow communication interface 820 (as shown in FIG. 8) from the voice-robot interface module 320. At 720, one or more motion parameters are converted into a control signal by a UDP server 810 as shown in FIG. 8. At 730, the control signal is used in a robot bottom motion control, to control a movement of the robot 120 at 740. At 750, a real-time position from a sensor of the industrial robot is feedback to the robot motion control module 330. In this way, a movement of the industrial robot can be adjusted in real-time, and thus enabling a high accuracy of control.

FIG. 8 illustrates a schematic diagram of architecture 800 for communicating between the UDP server and the voice-robot interface module 320 via a data flow communication interface in accordance with embodiments of the present disclosure. In embodiments of the present disclosure, the voice-robot interface module 320 acts as a UDP client communicating with the UDP server 810 via the data flow communication interface 820. In the data flow communication interface 820, a Protocol*.proto file is compiled into such as a C# protocol file*.cs file via a ProtofC compiler.

Figure 9B:
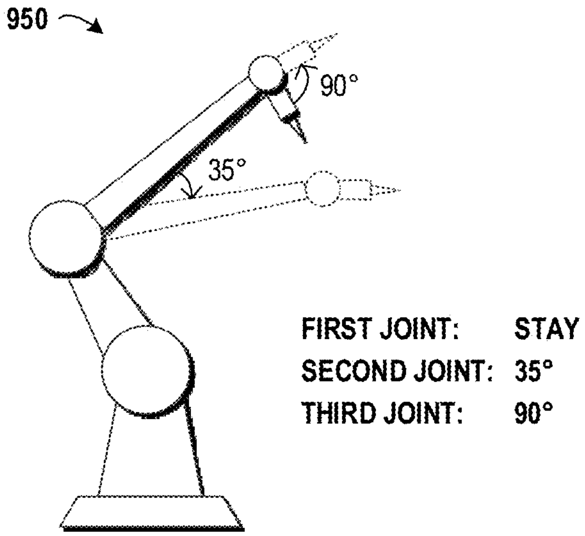
FIG. 9B illustrates an example of a movement for the industrial robot in the joint angle mode in accordance with embodiments of the present disclosure.

Reference will be made to FIG. 9A and FIG. 9B for a description of an exemplary movement of the robot. FIG. 9A illustrates an example of a movement 900 for the industrial robot in the Cartesian spatial pose mode based on the voice control in accordance with embodiments of the present disclosure. A set of motion parameters in the Cartesian spatial pose mode is determined from a voice input according to the method 200. The set of motion parameters as shown in FIG. 9A indicates that a joint should move 6 mm in Y direction, relatively to a target object, with no rotations.

FIG. 9B illustrates an example of a movement 950 for the industrial robot in the joint angle mode based on the voice control in accordance with embodiments of the present disclosure. A set of motion parameters in the joint angle mode is determined from a voice input according to the method 200. The set of motion parameters as shown in FIG. 9B indicates that a first joint does not move, a second joint moves 35° and a third joint moves 90°. It should be noted that the values of motion parameters are only exemplary, and are not intended to limit the scope of the present disclosure.

Figure 10:
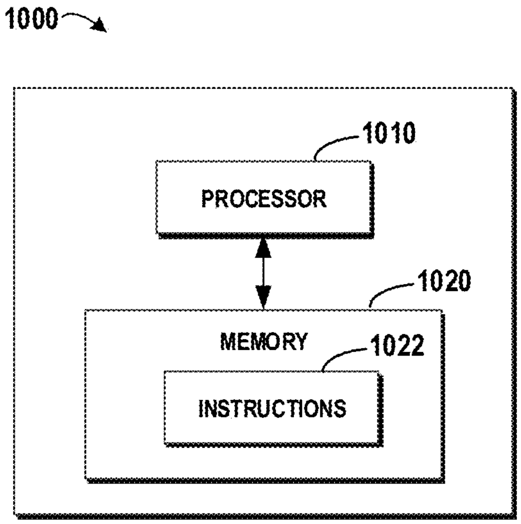
FIG. 10 illustrates a schematic diagram of an apparatus for controlling an industrial robot in accordance with embodiments of the present disclosure.

The preceding paragraphs having described detailed steps of the method 200 in some embodiments of the present disclosure, the method 200 may be implemented by corresponding apparatuses, e.g. in industrial robots. FIG. 10 illustrates a schematic diagram of an apparatus 1000 for controlling an industrial robot in accordance with embodiments of the present disclosure. The apparatus 1000 comprises a processor 1010 coupled to a memory 1020, and the memory 1020 comprises instructions 1022 that when executed by the processor 1010 implements the method according to embodiments of the present application.

In some embodiments with respect to apparatus 1000, determining the motion mode comprises: determining a mode identifier based on voice recognition to the first voice input; and determining the motion mode based on the mode identifier and a Dynamic Link Library (DLL) encapsulated in the industrial robot, the DLL storing a plurality of predetermined modes and a plurality of predetermined parameter ranges for controlling a movement of the industrial robot.

In some embodiments with respect to apparatus 1000, controlling the industrial robot comprises: obtaining a predetermined parameter range corresponding to the determined motion mode from the DLL; determining a validity of the one or more motion parameters based on the predetermined parameter range; and in response to determining that the one or more motion parameters are valid, controlling the industrial robot to move according to the one or more motion parameters.

In some embodiments with respect to apparatus 1000, determining the validity of the one or more motion parameters comprises: determining whether each of the one or more motion parameters is within the predetermined parameter range; and in response to determining that each of the one or more motion parameters is within the predetermined parameter range, determining that the one or more motion parameters are valid.

In some embodiments with respect to apparatus 1000, the plurality of predetermined modes include at least a joint angle mode and a Cartesian spatial pose mode, the joint angle mode indicates that a movement of the industrial robot is represented by an angle of a joint, and the Cartesian spatial pose mode indicates that a movement of the industrial robot is represented by a Cartesian Coordinate System.

In some embodiments with respect to apparatus 1000, determining the validity of the one or more motion parameters comprises: in response to determining that the determined motion mode is the joint angle mode, comparing a number of joints indicated in the one or more motion parameters to a number of joints of the industrial robot; and in response to determining that the number of joints indicated in the one or more motion parameters exceeds the number of joints of the industrial robot, determining that the one or more motion parameters are invalid.

In some embodiments with respect to apparatus 1000, determining the validity of the one or more motion parameters comprises: in response to determining that the determined motion mode is the Cartesian spatial pose mode, determining a sum of squares of quaternion values included in the one or more motion parameters; and in response to determining that the sum of squares does not equal to 1, determining that the one or more motion parameters are invalid.

In some embodiments with respect to apparatus 1000, controlling the industrial robot comprises: receiving a real-time position from a sensor of the industrial robot; and controlling the industrial robot to move according to the real-time position data.

In some embodiments with respect to apparatus 1000, the motion mode and the one or more motion parameters are represented in a text format.

In some embodiments with respect to apparatus 1000, the method further comprises: receiving a first recognized result of the first voice input and a second recognized result of the second voice input from an Industrial Personal Computer, wherein determining the motion mode comprises determining the motion mode based on the first recognized result, and wherein determining the one or more motion parameters comprises determining the one or more motion parameters based on the second recognized result.

In some embodiments with respect to apparatus 1000, the first recognized result and the second recognized result are obtained through noise reduction.

In some embodiments with respect to apparatus 1000, controlling the industrial robot to move in the determined motion mode according to the one or more motion parameters comprises: converting the one or more motion parameters into a control signal; and control the industrial robot to move according to the control signal.

In some embodiments of the present disclosure, a computer readable medium for controlling an industrial robot is provided. The computer readable medium has instructions stored thereon, and the instructions, when executed on at least one processor, may cause at least one processor to perform the method for controlling an industrial robot as described in the preceding paragraphs.

In some embodiments with respect to the computer readable medium, determining the motion mode comprises: determining a mode identifier based on voice recognition to the first voice input; and determining the motion mode based on the mode identifier and a Dynamic Link Library (DLL) encapsulated in the industrial robot, the DLL storing a plurality of predetermined modes and a plurality of predetermined parameter ranges for controlling a movement of the industrial robot.

In some embodiments with respect to the computer readable medium, controlling the industrial robot comprises: obtaining a predetermined parameter range corresponding to the determined motion mode from the DLL; determining a validity of the one or more motion parameters based on the predetermined parameter range; and in response to determining that the one or more motion parameters are valid, controlling the industrial robot to move according to the one or more motion parameters.

In some embodiments with respect to the computer readable medium, determining the validity of the one or more motion parameters comprises: determining whether each of the one or more motion parameters is within the predetermined parameter range; and in response to determining that each of the one or more motion parameters is within the predetermined parameter range, determining that the one or more motion parameters are valid.

In some embodiments with respect to the computer readable medium, the plurality of predetermined modes include at least a joint angle mode and a Cartesian spatial pose mode, the joint angle mode indicates that a movement of the industrial robot is represented by an angle of a joint, and the Cartesian spatial pose mode indicates that a movement of the industrial robot is represented by a Cartesian Coordinate System.

In some embodiments with respect to the computer readable medium, determining the validity of the one or more motion parameters comprises: in response to determining that the determined motion mode is the joint angle mode, comparing a number of joints indicated in the one or more motion parameters to a number of joints of the industrial robot; and in response to determining that the number of joints indicated in the one or more motion parameters exceeds the number of joints of the industrial robot, determining that the one or more motion parameters are invalid.

In some embodiments with respect to the computer readable medium, determining the validity of the one or more motion parameters comprises: in response to determining that the determined motion mode is the Cartesian spatial pose mode, determining a sum of squares of quaternion values included in the one or more motion parameters; and in response to determining that the sum of squares does not equal to 1, determining that the one or more motion parameters are invalid.

In some embodiments with respect to the computer readable medium, controlling the industrial robot comprises: receiving a real-time position from a sensor of the industrial robot; and controlling the industrial robot to move according to the real-time position data.

In some embodiments with respect to the computer readable medium, the motion mode and the one or more motion parameters are represented in a text format.

In some embodiments with respect to the computer readable medium, the method further comprises: receiving a first recognized result of the first voice input and a second recognized result of the second voice input from an Industrial Personal Computer, wherein determining the motion mode comprises determining the motion mode based on the first recognized result, and wherein determining the one or more motion parameters comprises determining the one or more motion parameters based on the second recognized result.

In some embodiments with respect to the computer readable medium, the first recognized result and the second recognized result are obtained through noise reduction.

In some embodiments with respect to the computer readable medium, controlling the industrial robot to move in the determined motion mode according to the one or more motion parameters comprises: converting the one or more motion parameters into a control signal; and control the industrial robot to move according to the control signal.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling an industrial robot, comprising:

determining a motion mode for the industrial robot based on a first voice input, comprising:

determining a mode identifier based on voice recognition to the first voice input; and determining the motion mode based on the mode identifier and a Dynamic Link Library (DLL) encapsulated in the industrial robot, the DLL storing a plurality of predetermined modes and a plurality of predetermined parameter ranges for controlling a movement of the industrial robot;

determining one or more motion parameters in the determined motion mode based on a second voice input; and controlling the industrial robot to move in the determined motion mode according to the one or more motion parameters, comprising:

obtaining a predetermined parameter range corresponding to the determined motion mode from the DLL;

determining a validity of the one or more motion parameters based on the predetermined parameter range, comprising:

determining whether each of the one or more motion parameters is within the predetermined parameter range; and in response to determining that each of the one or more motion parameters is within the predetermined parameter range, determining that the one or more motion parameters are valid; and in response to determining that the one or more motion parameters are valid, controlling the industrial robot to move according to the one or more motion parameters;

wherein the plurality of predetermined modes include at least a joint angle mode and a Cartesian spatial pose mode, the joint angle mode indicates that a movement of the industrial robot is represented by an angle of a joint, and the Cartesian spatial pose mode indicates that a movement of the industrial robot is represented by a Cartesian Coordinate System.

2. The method of claim 1, wherein determining the validity of the one or more motion parameters comprises:

in response to determining that the determined motion mode is the joint angle mode, comparing a number of joints indicated in the one or more motion parameters to a number of joints of the industrial robot; and in response to determining that the number of joints indicated in the one or more motion parameters exceeds the number of joints of the industrial robot, determining that the one or more motion parameters are invalid.

3. The method of claim 1, wherein determining the validity of the one or more motion parameters comprises:

in response to determining that the determined motion mode is the Cartesian spatial pose mode, determining a sum of squares of quaternion values included in the one or more motion parameters; and in response to determining that the sum of squares is not equal to 1, determining that the one or more motion parameters are invalid.

4. The method of claim 1, wherein controlling the industrial robot to move comprises:

receiving a real-time position from a sensor of the industrial robot; and controlling the industrial robot to move according to a real-time position data.

5. The method of claim 1, wherein the motion mode and the one or more motion parameters are represented in a text format.

6. The method of claim 1, further comprising:

receiving a first recognized result of the first voice input and a second recognized result of the second voice input from an Industrial Personal Computer, wherein determining the motion mode comprises determining the motion mode based on the first recognized result, and wherein determining the one or more motion parameters comprises determining the one or more motion parameters based on the second recognized result.

7. The method of claim 6, wherein the first recognized result and the second recognized result are obtained through noise reduction.

8. The method of claim 1, wherein controlling the industrial robot to move comprises:

converting the one or more motion parameters into a control signal; and control the industrial robot to move according to the control signal.

9. An industrial robot, comprising:

a processor; and a non-transitory computer readable memory coupled to the processor and comprising instructions that when executed by the processor, cause the processor to perform a method comprising:

determining a motion mode for the industrial robot based on a first voice input, comprising:

determining a mode identifier based on voice recognition to the first voice input; and determining the motion mode based on the mode identifier and a Dynamic Link Library (DLL) encapsulated in the industrial robot, the DLL storing a plurality of predetermined modes and a plurality of predetermined parameter ranges for controlling a movement of the industrial robot;

determining one or more motion parameters in the determined motion mode based on a second voice input; and controlling the industrial robot to move in the determined motion mode according to the one or more motion parameters, comprising:

obtaining a predetermined parameter range corresponding to the determined motion mode from the DLL;

determining a validity of the one or more motion parameters based on the predetermined parameter range, comprising:

determining whether each of the one or more motion parameters is within the predetermined parameter range; and in response to determining that each of the one or more motion parameters is within the predetermined parameter range, determining that the one or more motion parameters are valid; and in response to determining that the one or more motion parameters are valid, controlling the industrial robot to move according to the one or more motion parameters;

wherein the plurality of predetermined modes include at least a joint angle mode and a Cartesian spatial pose mode, the joint angle mode indicates that a movement of the industrial robot is represented by an angle of a joint, and the Cartesian spatial pose mode indicates that a movement of the industrial robot is represented by a Cartesian Coordinate System.

10. A non-transitory computer readable medium having instructions stored thereon, the instructions, when executed by a processor, cause the processor to perform the method according to claim 1.

11. A computer program product embodied on a non-transitory computer readable medium, the non-transitory computer readable medium having instructions stored thereon, the instructions, when executed by a processor, cause the processor to perform the method according to claim 1.

* * * * *